United States Patent
Ishigaki

(10) Patent No.: US 7,225,043 B2
(45) Date of Patent: May 29, 2007

(54) SYSTEM, METHOD AND PROGRAM FOR TRACING MANUFACTURING PROCESSES

(75) Inventor: Yoshinobu Ishigaki, Yokohama (JP)

(73) Assignee: International Business Machines Corporation, Armonk, NY (US)

(*) Notice: Subject to any disclaimer, the term of this patent is extended or adjusted under 35 U.S.C. 154(b) by 93 days.

(21) Appl. No.: 11/141,456

(22) Filed: May 31, 2005

(65) Prior Publication Data

US 2005/0267611 A1 Dec. 1, 2005

(30) Foreign Application Priority Data

Jun. 1, 2004 (JP) .............................. 2004-163521

(51) Int. Cl.
*G06F 19/00* (2006.01)
*G06F 7/66* (2006.01)

(52) U.S. Cl. ..................... 700/115; 700/96; 700/99; 700/104; 700/108; 700/112; 700/116; 700/228; 702/182; 702/183; 702/186; 705/8; 705/10

(58) Field of Classification Search ............... 700/104, 700/108, 99, 95–97, 112, 115, 116, 228; 702/182–186; 705/8–10

See application file for complete search history.

(56) References Cited

U.S. PATENT DOCUMENTS

| 6,094,729 A * | 7/2000 | Mann .......................... 714/25 |
| 6,154,857 A * | 11/2000 | Mann .......................... 714/30 |
| 6,314,530 B1 * | 11/2001 | Mann .......................... 714/38 |
| 6,662,066 B1 * | 12/2003 | Yu et al. ..................... 700/108 |
| 6,748,287 B1 * | 6/2004 | Hagen et al. ................. 700/99 |
| 6,990,388 B2 * | 1/2006 | Akimori et al. ............. 700/121 |
| 2003/0158769 A1 | 8/2003 | Uno et al. |
| 2005/0143851 A1 * | 6/2005 | Scalfani et al. ............. 700/108 |
| 2005/0197738 A1 * | 9/2005 | Morrison et al. ........... 700/231 |

* cited by examiner

*Primary Examiner*—Ramesh Patel
(74) *Attorney, Agent, or Firm*—Arthur J. Samodovitz

(57) ABSTRACT

System, method and program product for tracing first, second and third processes for producing a product. First, second and third process instances for the first, second and third processes, respectively, are generated. Tracing information is stored in association with the first, second and third process instances to indicate respective execution conditions. The third process instance is executed after the second process instance, and the second process instance is executed after the first process instance. The first process instance yields a product which is subject to the second process instance, and the second process instance yields a product which is subject to the third process instance. A first pointer indicates that the second process instance follows the first process instance, and a second pointer indicates that the third process instance follows the second process instance.

18 Claims, 13 Drawing Sheets

[Figure 2]
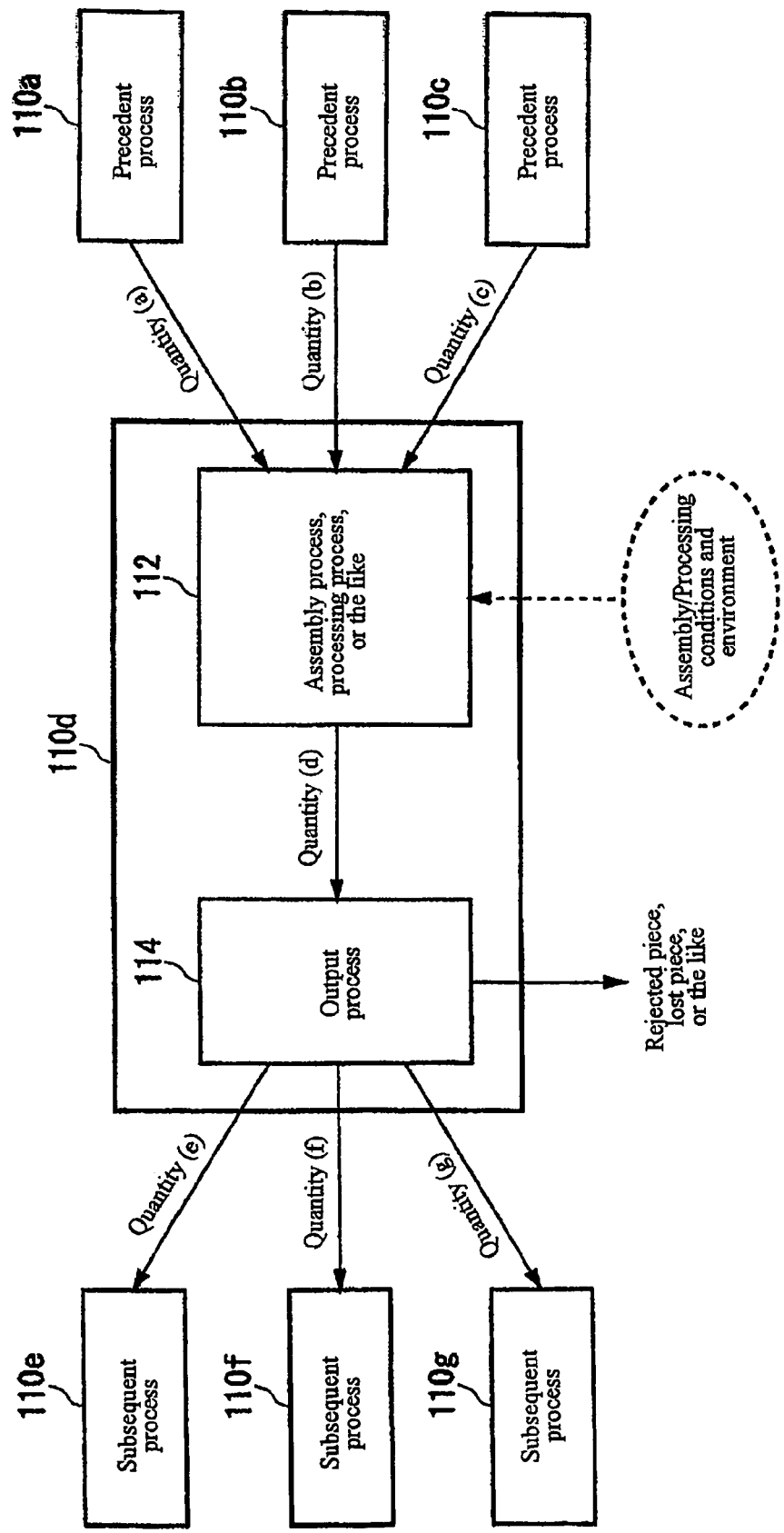

[Figure 3]
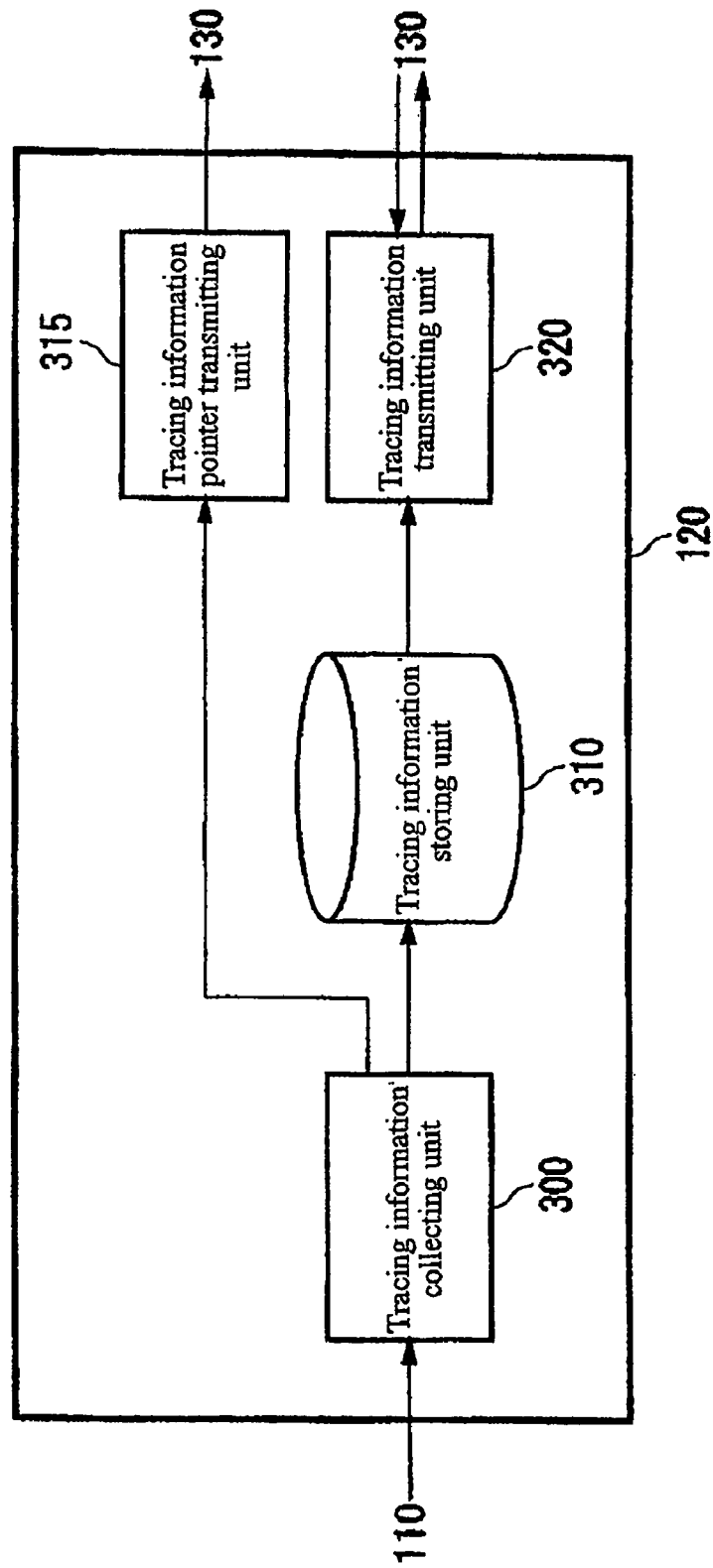

[Figure 4]
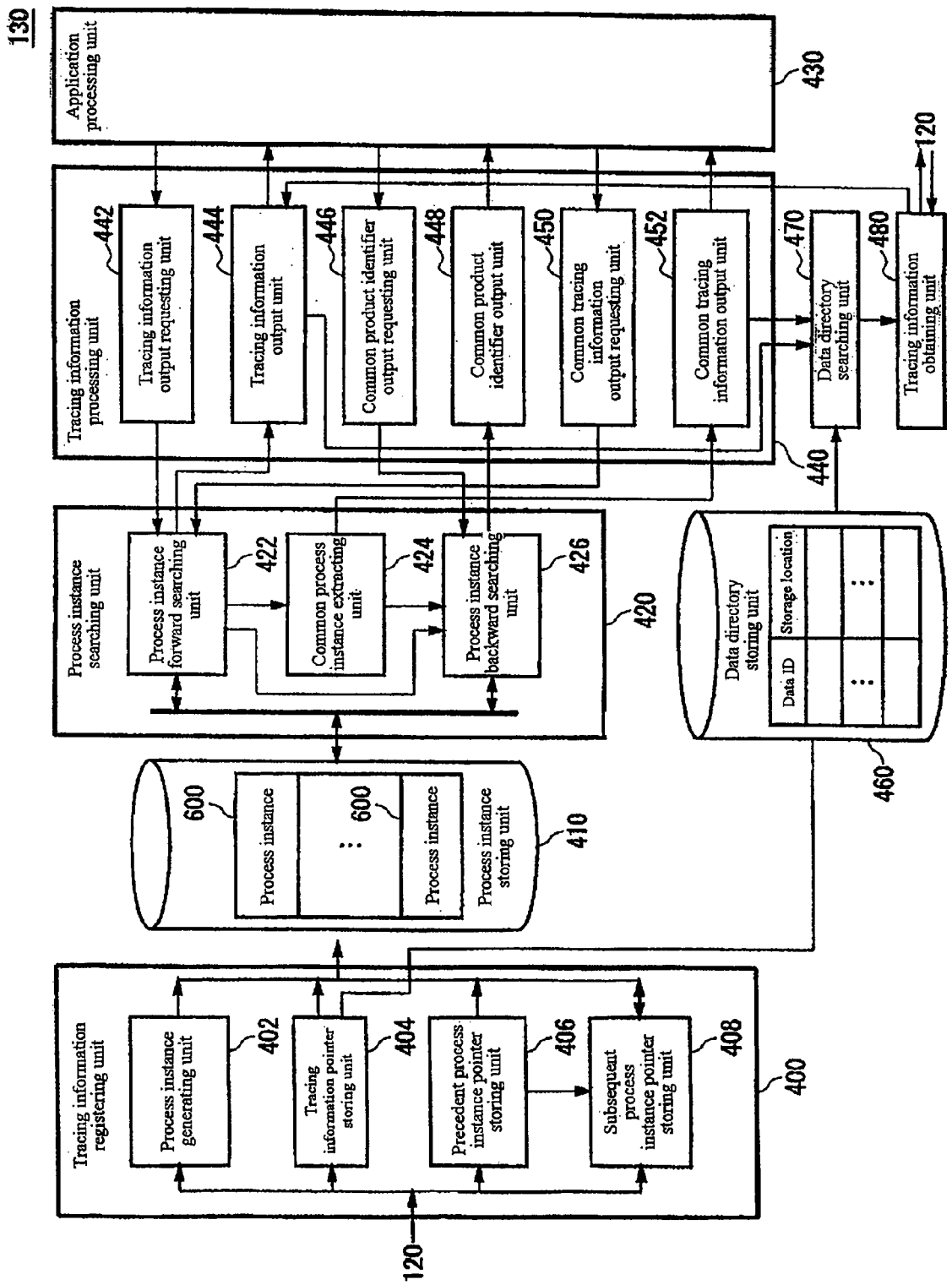

[Figure 5]
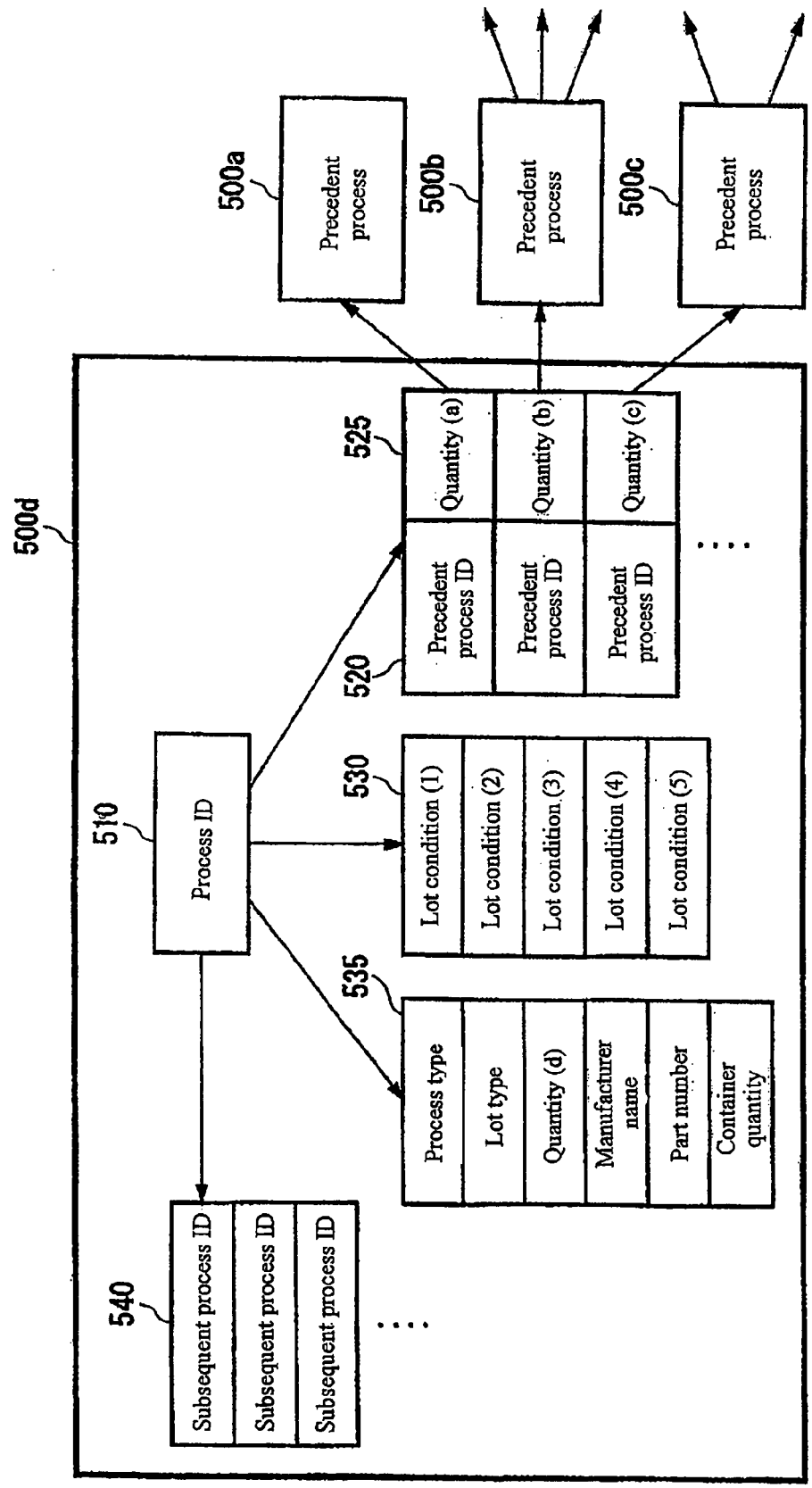

[Figure 6]
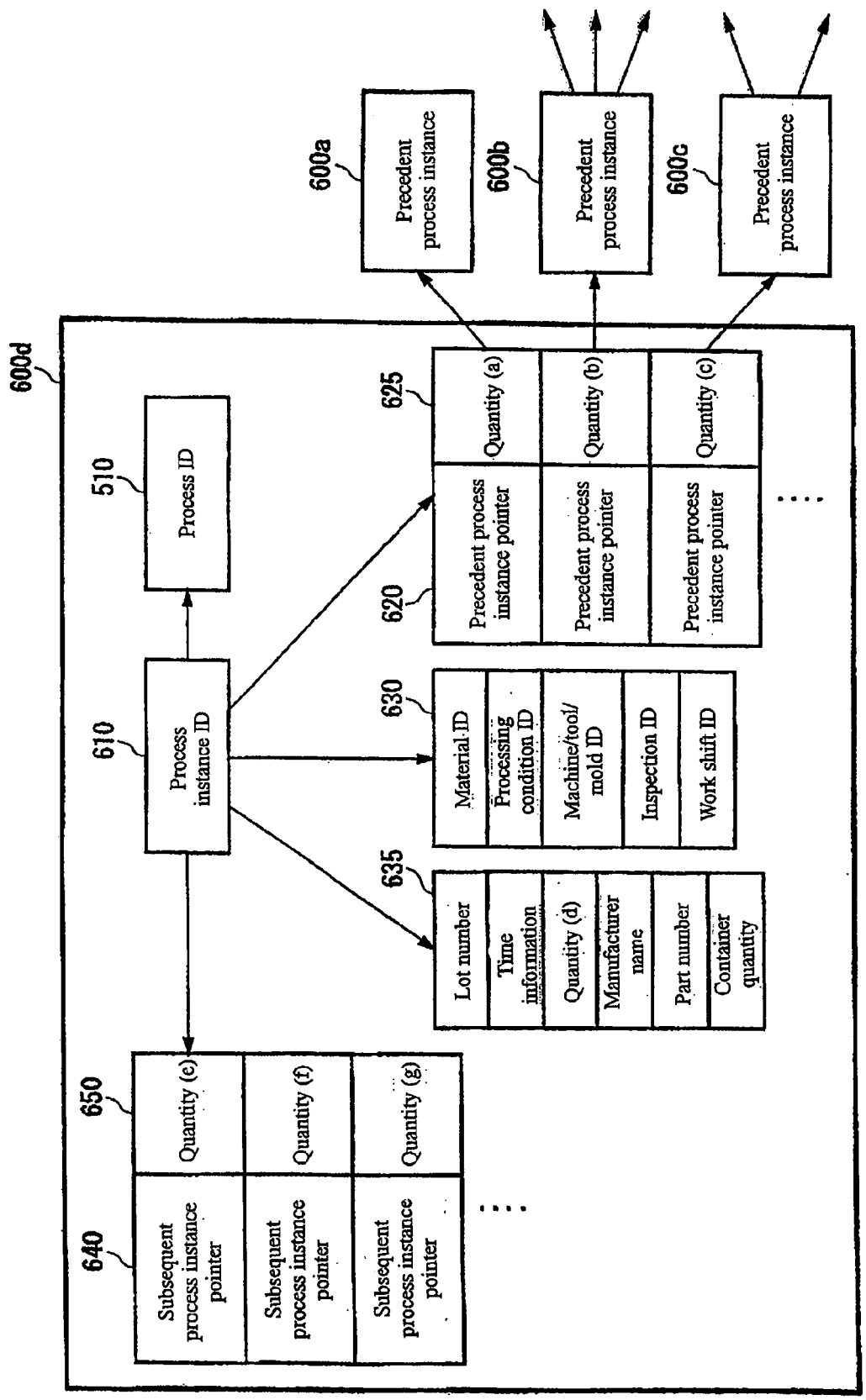

[Figure 7]
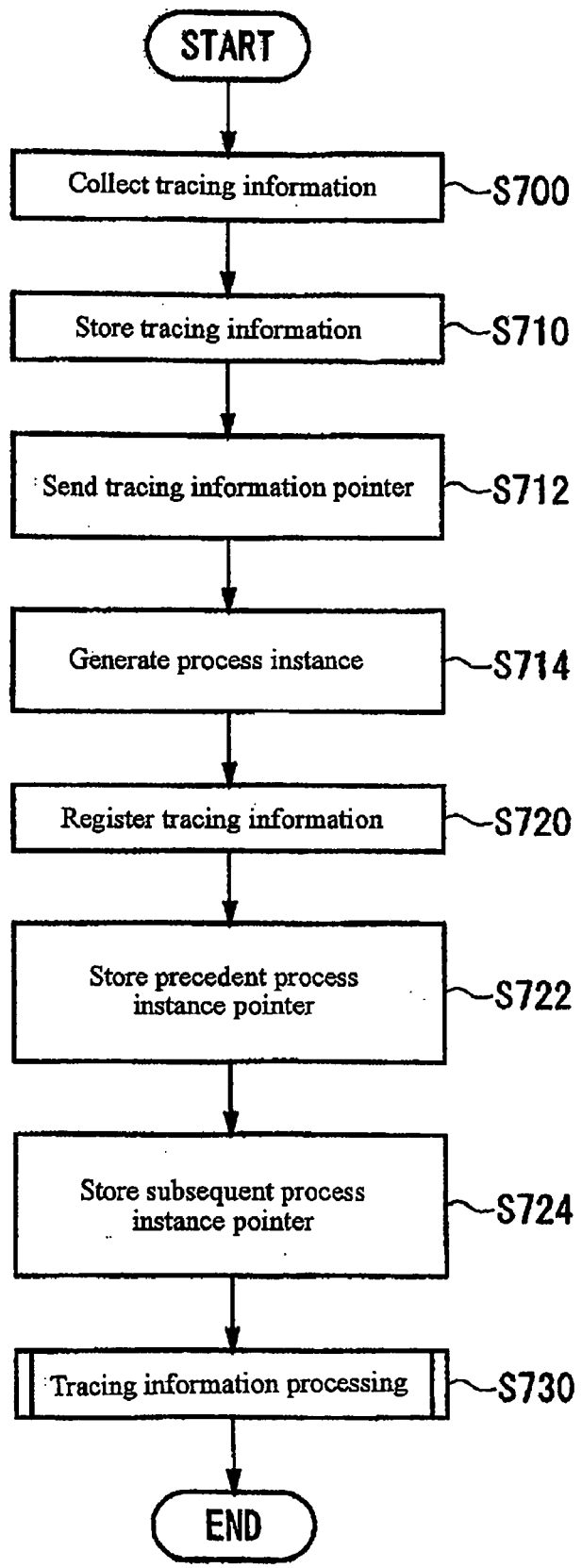

[Figure 8]
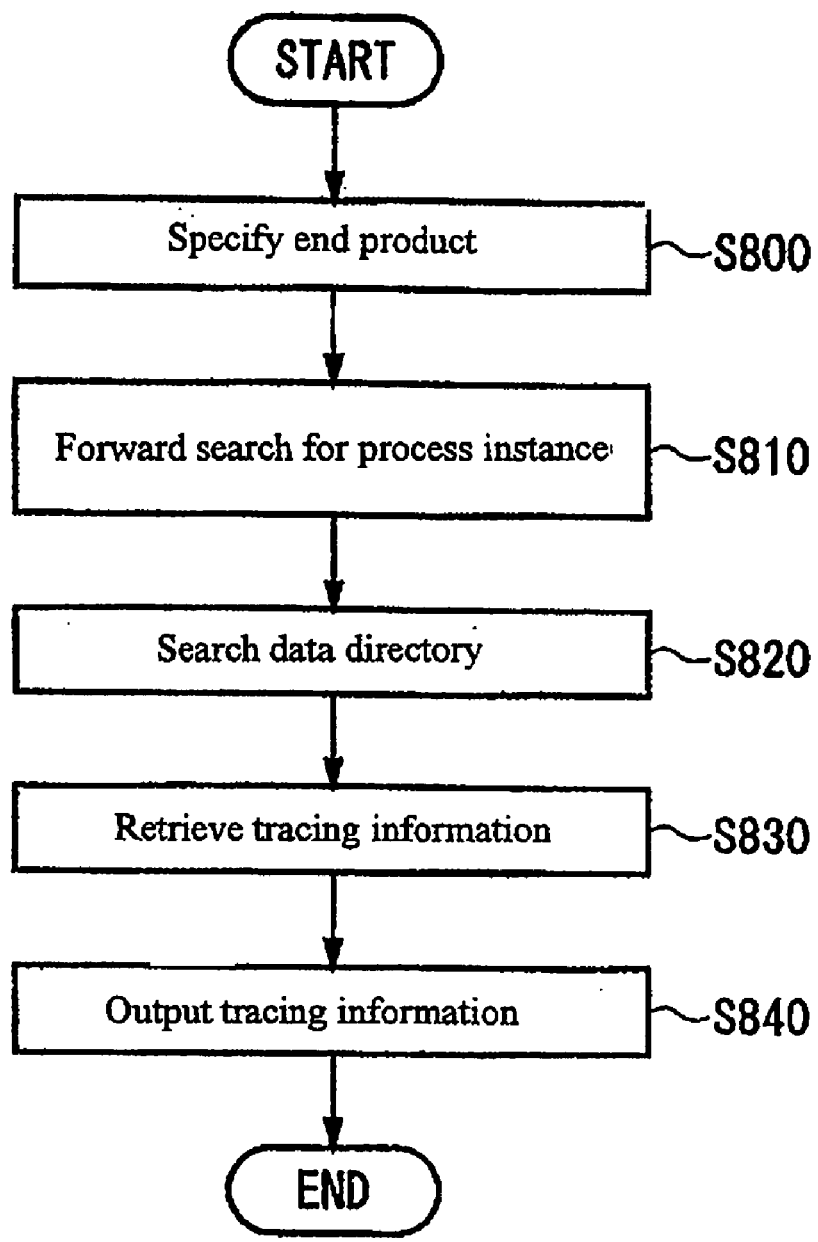

[Figure 9]
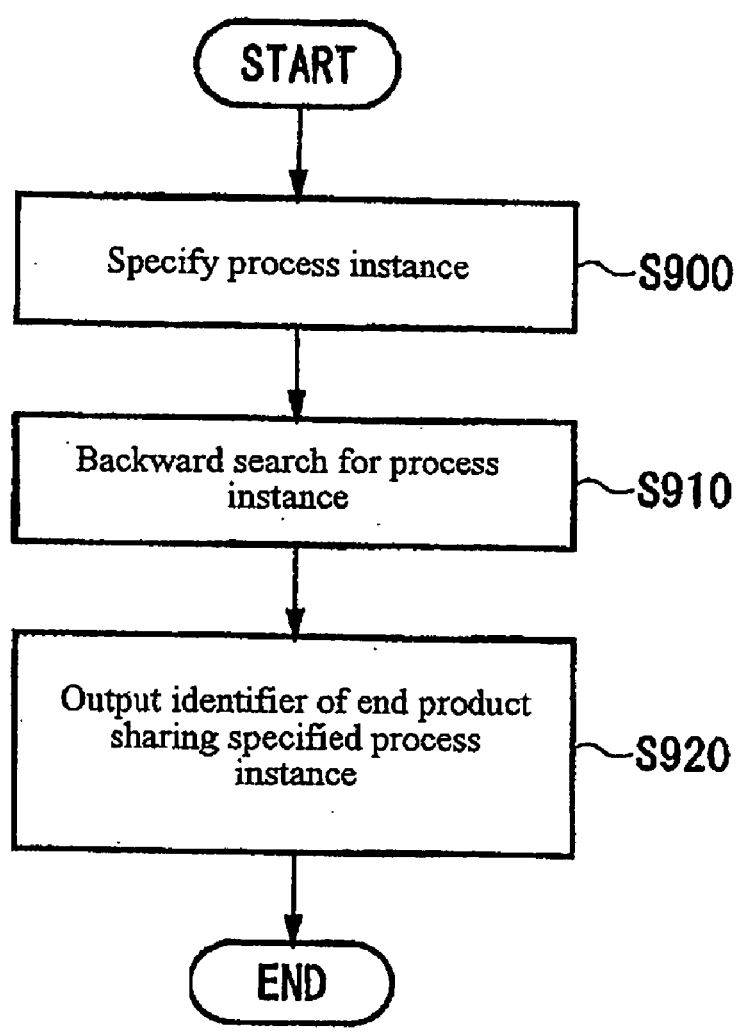

[Figure 10]
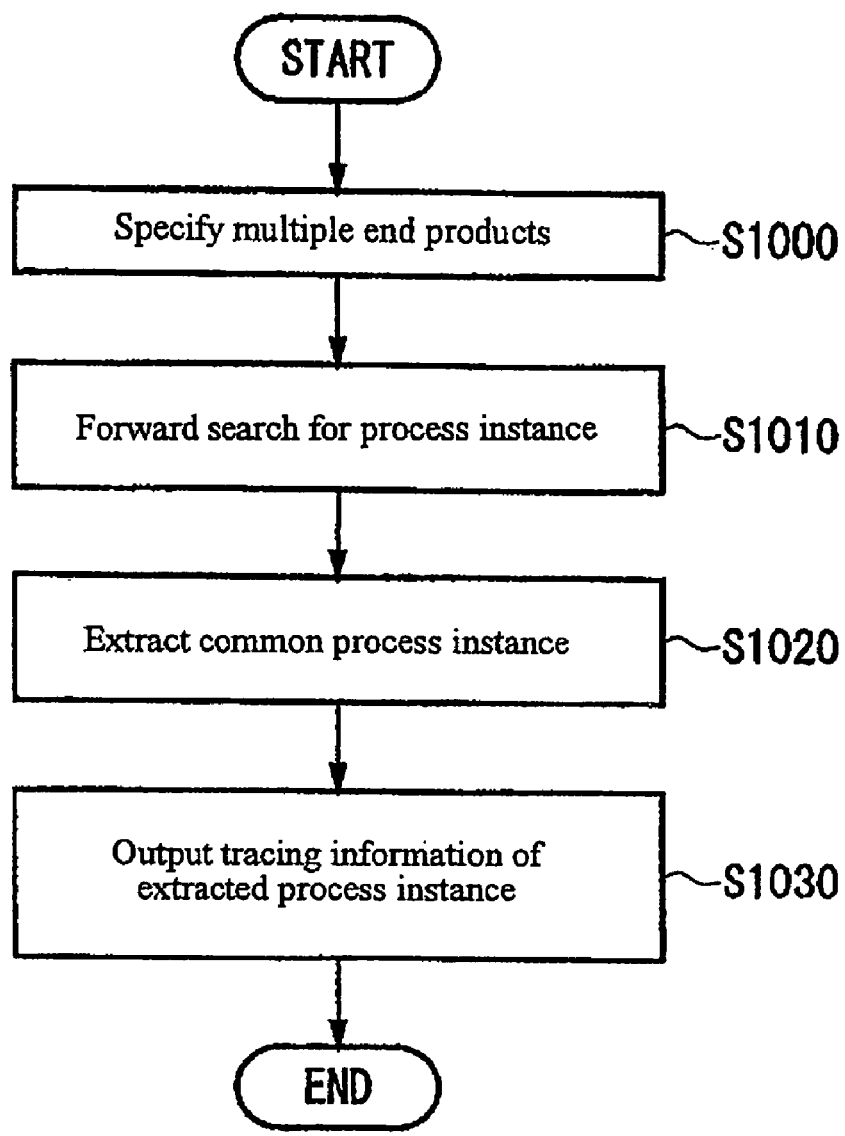

[Figure 11]
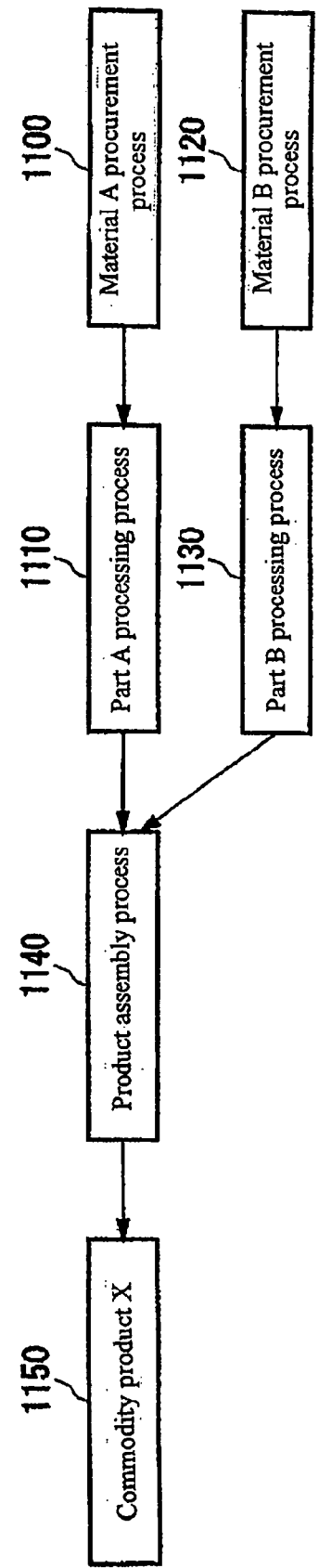

[Figure 12]
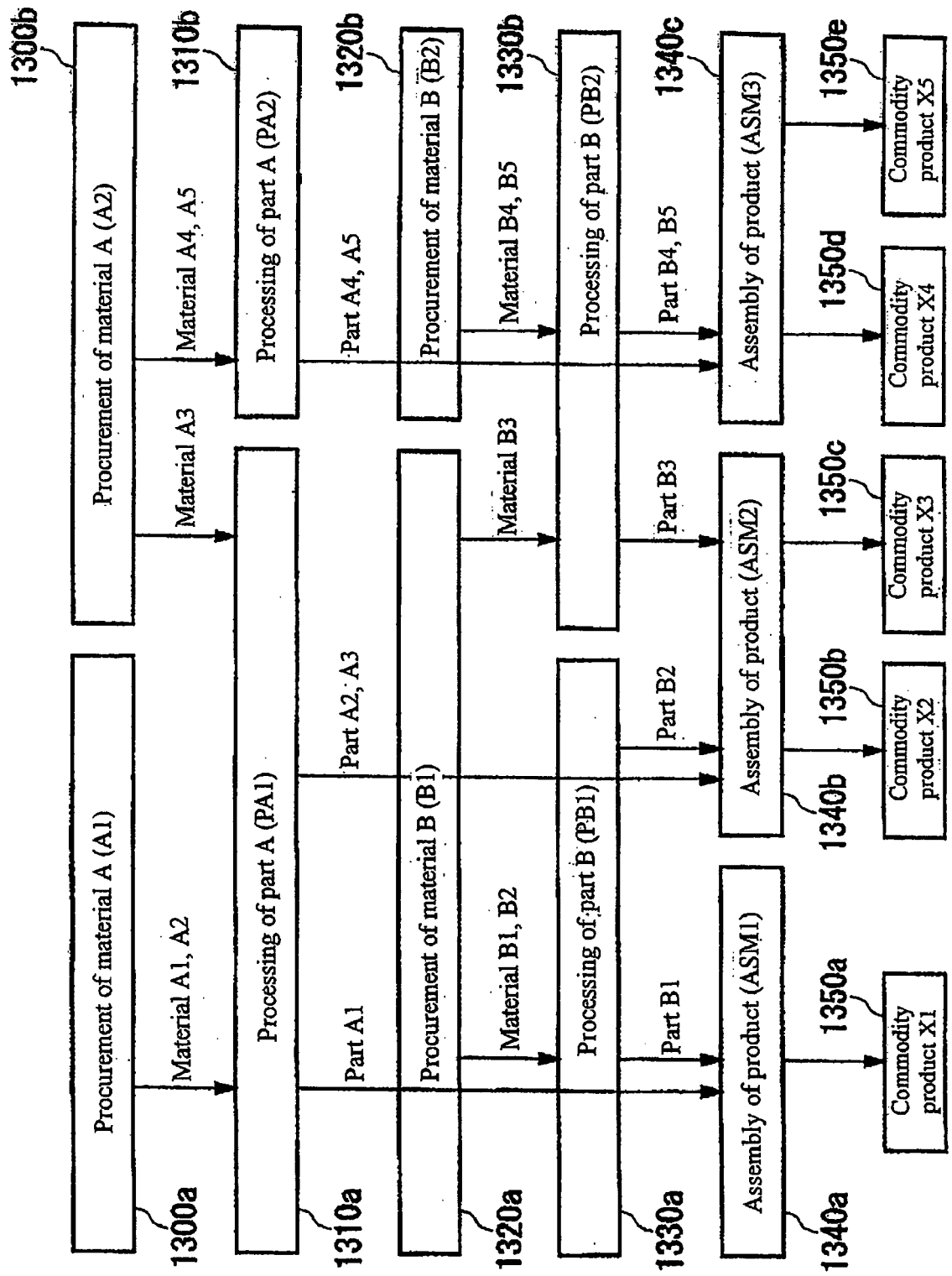

[Figure 13]
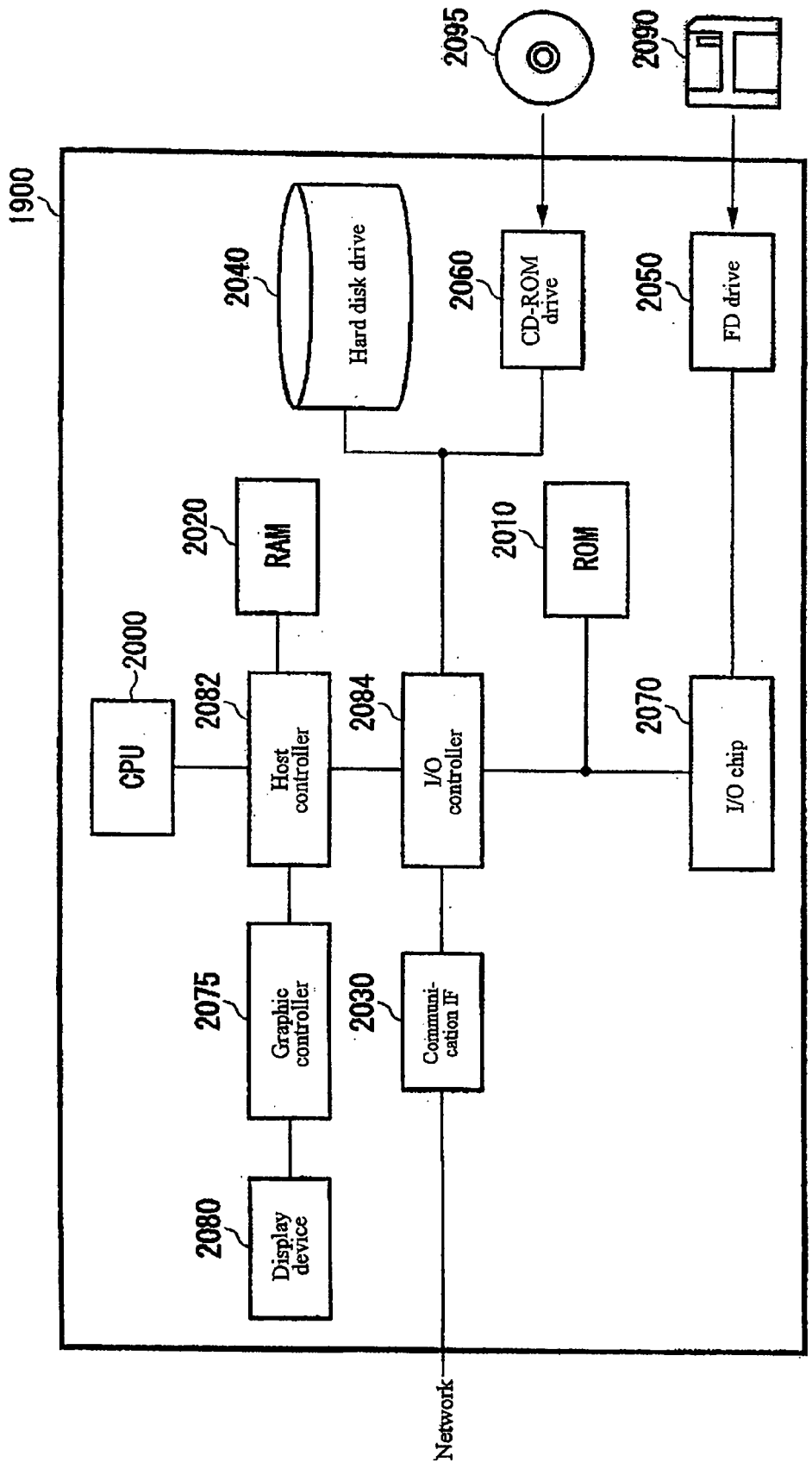

SYSTEM, METHOD AND PROGRAM FOR TRACING MANUFACTURING PROCESSES

BACKGROUND

The present invention relates to tracing a series of manufacturing processes for quality control or other purposes.

A known tracing system collects various kinds of information concerning resources, materials, parts and assemblies used to manufacture a product. This information is used for quality control and quality assurance of each product. IBM Japan, "Traceability System" (online), Internet URL: http://www-6.ibm.com/jp/solutions/wireless/solution/wiress_trac ing.html> (Searched on May 17, 2004) discloses such a known tracing system.

US Published Patent Application U.S. 2003/0158769 A1 discloses a method of managing a supply chain by a computer system. There is a step in the input phase of treating various objects to be managed as management objects and setting lots for these, a step of assigning ID management data to each of the plurality of lots, and a step of preparing part charts or process charts. The method includes, at the output phase, a step of creating correspondence data and making allocations between two lots with linkage among the plurality of lots, and a step of changing the relationship of the allocations based on a plurality of correspondence data relating to two lots in the plurality of lots when a change occurs in a received order.

An object of the present invention is to provide a versatile, flexible and comprehensive tracing technique for a manufacturing or other process.

SUMMARY OF THE INVENTION

The invention resides in a system, method and program product for tracing a series of processes for producing a product. A first process instance for a first one of said processes is generated, and tracing information is stored in association with the first process instance to indicate an execution condition for the first process instance. A second process instance for a second one of the processes is generated, and tracing information is stored in association with the second process instance to indicate an execution condition for the second process instance. A third process instance for a third one of the processes is generated, and tracing information is stored in association with the third process instance to indicate an execution condition for the third process instance. The third process instance is executed after the second process instance, and the second process instance is executed after the first process instance. The first process instance yields a product which is subject to the second process instance, and the second process instance yields a product which is subject to the third process instance. A first pointer indicates that the second process instance follows the first process instance, and a second pointer indicates that the third process instance follows the second process instance.

BRIEF DESCRIPTION OF THE DRAWINGS

FIG. 2 shows a configuration of processes 110 according to the foregoing embodiment of the present invention.

FIG. 3 shows a configuration of a distributed server device 120 according to the foregoing embodiment of the present invention.

FIG. 4 shows a configuration of a central server device 130 according to the foregoing embodiment of the present invention.

FIG. 5 shows a configuration of a process 500 according to the foregoing embodiment of the present invention.

FIG. 6 shows a configuration of a process instance 600 according to the foregoing embodiment of the present invention.

FIG. 7 shows an operation flow in the tracing system 10 according to the foregoing embodiment of the present invention.

FIG. 8 shows a first exemplary tracing information processing flow in the tracing system 10 according to the foregoing embodiment of the present invention.

FIG. 9 shows a second exemplary tracing information processing flow in the tracing system 10 according to the foregoing embodiment of the present invention.

FIG. 10 shows a third exemplary tracing information processing flow in the tracing system 10 according to the foregoing embodiment of the present invention.

FIG. 11 shows an example of a process chain according to the foregoing embodiment of the present invention.

FIG. 12 shows an example of links between process instances according to the foregoing embodiment of the present invention.

FIG. 13 shows a hardware configuration of a computer 1900 according to the foregoing embodiment of the present invention.

DETAILED DESCRIPTION OF THE PREFERRED EMBODIMENTS

Figure 1:
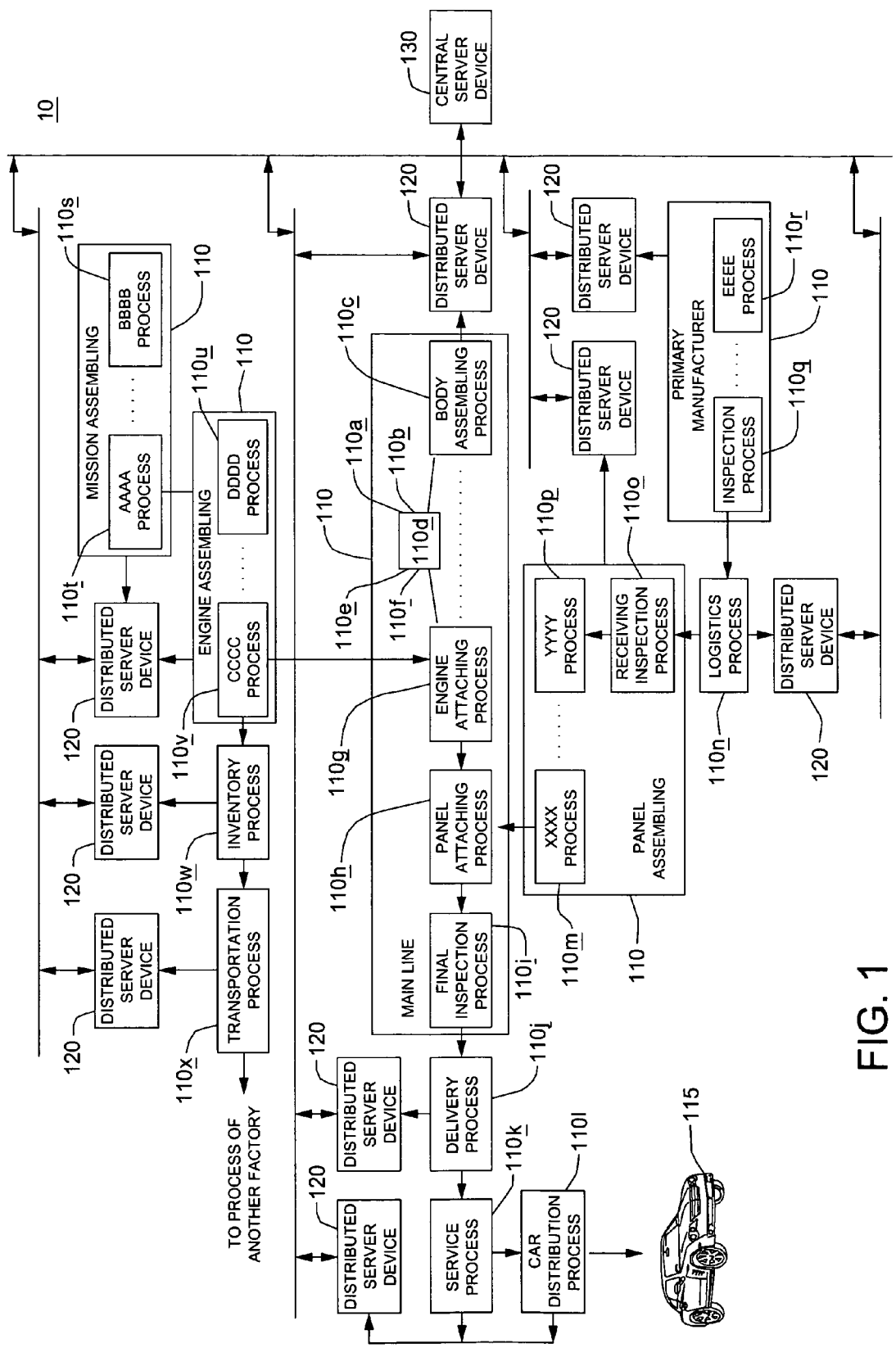
FIG. 1 shows a configuration of a tracing system 10 according to an embodiment of the present invention.

FIG. 1 shows a tracing system 10 according to an embodiment of the present invention. The tracing system 10 efficiently manages information concerning processes 110a,b, c,d . . . x (collectively called a process group 110) in a process chain performed for producing an end product. The tracing system 10 includes one or more distributed server devices 120 and a central server device 130. Each of the processes 110a,b,c,d . . . x performs or executes its operations on a resultant product (such as a semi-manufactured product) resulting from the precedent processes 110a,b,c, d . . . x and provides its resultant product (a semi-manufactured product or an end product 115). The processes may be a product assembly process, a product processing process, a product inspection process, a product transportation process and/or an inventory process, for example, which may be set by a designer of the process chain model in any granularity. For convenience of modeling, the last one or more processes 110a,b,c,d . . . x of a process chain may represent the end product 115 itself.

Each distributed server device 120 collects tracing information identifying an execution condition under which a person and/or apparatus perform a process 110a,b,c,d . . . x assigned to the distributed server device 120. The person and/or apparatus performs a process on a product resulting from the preceding process such as an assembly, processing, inspection, transportation, and/or inventorying. Each of the distributed server devices 120 may be provided for each individual process 110a,b,c,d . . . x or a process group 110 of a number of processes 110a,b,c,d . . . x.

Tracing information is information concerning conditions under which a person and/or apparatus performing a process 110a,b,c,d . . . x was executed when the process 110a,b,c, d . . . x was performed on a resultant product resulting from the precedent process 110a,b,c,d . . . x. For example, the tracing information may be information identifying the company such as the manufacturer, processor, inspector, or carrier that performed the process 110a,b,c,d . . . x, or may be information identifying the site such as the factory, production line, transportation facility, or warehouse at which the process was performed. Furthermore, the tracing information may be information identifying a person such as operator, shift worker, inspector who performed the process, or may be information identifying ambient conditions such as temperature and humidity under which the process was performed. The tracing information may be a combination of various types of information mentioned above.

The central server device 130 is connected to the multiple distributed server devices 120 and manages tracing information collected from each process 110a,b,c,d . . . x, by using a process chain model. The central server device 130 executes a tracing application which processes the collected tracing information.

The multiple distributed server devices 120 and the central server device 130 in the present embodiment make up a distributed system. Each distributed server device 120 stores tracing information and the central server device 130 manages the tracing information. The multiple distributed server devices 120 collect, through distributed processing, tracing information generated during the processes 110a,b,c,d . . . x associated with them, and stores the information. Thus, the tracing system 10 can prevent the central server device 130 from being bottlenecked due to concentration of tracing information on the central server device 130.

The central server device 130 uses a process chain model to manage the tracing information. When collecting tracing information concerning the end product specified by a tracing application, the model stored on the central server device 130 can be searched to select tracing information to collect. Thus, the central server device 130 can efficiently select the tracing information without frequent communications with the distributed server devices 120.

As described above, the tracing system 10 can efficiently implement a large process chain. In another embodiment, multiple distributed server devices 120 and the central server device 130 may be implemented by a single computer.

FIG. 2 shows processes 110a,b,c,d . . . g in more detail according to the present embodiment. In the present embodiment, assembly, processing, transportation, and/or inventory processes 110a,b,c,d . . . g can be modeled as shown in FIG. 2. In this example, process 110d is the focus. Process 110d is linked to one or more precedent processes 110a–110c and to one or more subsequent processes 110e–110g. Quantities (a)–(c) of resultant products (semi-manufactured products) output from the precedent processes 110a–110c are input into process 110d, which performs process 110d on the resultant products of the precedent processes 11a–110c. Then, process 110d provides quantities (e)–(g) of resultant products (semi-manufactured products or an end product 115) resulting from the execution of process 110d to the subsequent processes 110e–110g.

The remaining processes 110h,i . . . x are modeled in a similar manner, although not shown in FIG. 2. A resultant product herein is an actual semi-manufactured product or an end product resulting from the execution of processes 110a, b,c,d . . . x. If a process has a subsequent process 110a,b,c, d . . . x, the resultant product is provided to the subsequent process 110a,b,c,d . . . x. If the subsequent process 110a,b, c,d . . . x is an assembly process or a processing process, the resultant product is used as a part or raw material in the assembly or processing. If the subsequent process 110a,b,c, d . . . x is a transportation process or the like, the resultant product is transported as an item to be transported and then is provided to an additional subsequent process 110a,b,c, d . . . x. On the other hand, if the subsequent process 110a,b,c, d . . . x is an inventory process, the resultant product is temporarily stored in a warehouse and is taken out of the warehouse when needed in an additional subsequent process 110a,b,c,d . . . x.

Referring again to the processes of FIG. 2, process 110d is formed by a combination of an assembly/processing process 112 and/or an output process 114. The assembly/processing process 112 performs an assembly or processing of resultant products from the precedent processes 110a–110c and a quantity (d) of products. While performing this process, the distributed server device 120 collects tracing information, which is information concerning the conditions such as assembly or processing condition, or ambient conditions under which the process is performed.

The output process 114 outputs the resultant products resulting from process 110d to the subsequent processes 110e–110g. If some of the resultant products are rejected pieces or lost pieces, the output process 114 does not output them to the subsequent processes 110e–110g. If process 110d performs a process such as transportation or inventory that does not make a modification to an input resultant product by an operation such as assembly or processing, then process 110d is formed only by an output process 114 without any assembly/processing process 112.

As has been described above, the tracing system 10 can provide a general-purpose tracing system that can model various processes by providing a general model which represents each process 110a,b,c,d . . . x by a combination of an assembly/processing process 112 and an output process 114.

FIG. 3 shows a configuration of a distributed server device 120 according to the present embodiment. The distributed server device 120 includes a tracing information collecting unit 300, a tracing information storing unit 310, a tracing information pointer transmitting unit 315, and a tracing information transmitting unit 320. Each of these "units" comprises a computer program and associated data. When a process 110a,b,c,d . . . x assigned to the distributed server device 120 is executed, the tracing information collecting unit 300 collects tracing information that identifies execution conditions in association with a person and/or apparatus performing the process 110a,b,c,d . . . x. The tracing information storing unit 310 stores tracing information collected by the tracing information collecting unit 300 in association with the system. The tracing information pointer transmitting unit 315 transmits to the central server device 130 a pointer (tracing information pointer) that indicates the storage location of tracing information stored in the tracing information storing unit 310. The tracing information transmitting unit 320 reads out and transmits tracing information specified by the central server device 130 from the tracing information storing unit 310 when receiving a request for sending the tracing information from the central server device 130.

FIG. 4 shows a configuration of a central server device 130 according to the present embodiment. The central server device 130 includes a tracing information registering unit 400, a process instance storing unit 410, a process instance searching unit 420, an application processing unit 430, a tracing information processing unit 440, a data directory storing unit 460, a data directory searching unit 470, and a tracing information obtaining unit 480. Each of these "units" comprises a computer program and associated data.

The tracing information registering unit 400 receives a tracing information pointer from a distributed server device 120 and stores it in the process instance storing unit 410. By doing this, the tracing information registering unit 400 registers the tracing information in the central server device 130. The tracing information registering unit 400 includes a process instance generating unit 402, a tracing information pointer storing unit 404, a precedent process instance pointer storing unit 406, and a subsequent process instance pointer storing unit 408. The process instance generating unit 402 instantiates objects of processes included in a process chain model in accordance with the execution conditions of processes and thus generates process instances in which the storage locations of tracing information collected by distributed server devices 120 are registered, on the basis of the execution conditions of the persons and/or apparatuses performing the processes. The process instance generating unit 402 stores the process instances generated in the process instance storing unit 410.

The tracing information pointer storing unit 404 stores the pointer of tracing information it has received from a distributed server device 120 in association with a process instance 600 associated with the process being traced. The precedent process instance pointer storing unit 406 stores a precedent process instance pointer indicating the storage location of a precedent process instance preceding a process instance in association with that process instance. A precedent process instance is a process instance generated, for a process corresponding to a process instance of interest, in association with a person and/or apparatus that provides a resultant product resulting from the execution of the precedent process immediately preceding the process.

The subsequent process instance pointer storing unit 408 stores a subsequent process instance pointer indicating the storage location of a subsequent process instance subsequent to a process instance, in association with the process instance. A subsequent process instance is a process instance that corresponds to a person and/or apparatus that obtains a resultant product resulting from the process corresponding to a process instance of interest and executes the process subsequent to that process.

Pointers such as tracing information pointers, precedent process instance pointers, and subsequent process instance pointers may be information specifying the storage locations at which data specified by the pointers of tracing information, precedent process instances, and subsequent process instances are stored. The storage location information may be information specifying the address, file name, or index in a database in which the data is stored and may include information that specifies a server device on which the data is stored. These pointers may be the identifiers of data specified by the pointers. In that case, the central server device 130 identifies from the identifier the distributed server device 120 or the storage location on the distributed server device 120 in which the data is stored.

Each time the tracing information registering unit 400 described above receives a tracing information pointer for tracing information collected in association with the execution of each process, the tracing information registering unit 400 causes the central server device 130 to generate a process instance in association with the execution conditions of the process which is indicated by the tracing information. The central server device 130 can associate the process instances of the process with the process instances of the preceding and subsequent processes.

The process instance storing unit 410 stores one or more process instances 600 registered by the tracing information registering unit 400.

The process instance searching unit 420 searches for a process instance 600 stored in the process instance storing unit 410, in response to a request from the tracing information processing unit 440. The process instance searching unit 420 includes a process instance forward searching unit 422, a common process instance extracting unit 424, and a process instance backward searching unit 426. The process instance forward searching unit 422 retrieves, for each of one or more process instances 600 specified from an outside source, the process instances 600 of the precedent process in order, starting from the specified process instance 600, on the basis of the precedent process instance pointers recorded in the process instances 600. Thus, the process instance forward searching unit 422 can retrieve the process instance 600 corresponding to the processes performed on a resultant product resulting from the specified process instance 600, by searching the process instance chain. The common process instance extracting unit 424 extracts a process instance common to a set of process instances which has been retrieved by the process instance forward searching unit 422 in association with each of multiple process instances 600 specified from the external. Thus, the common process instance extracting unit 424 can obtain the process instance 600 corresponding to a process executed in common on resultant products resulting from the multiple process instances 600 specified.

The process instance backward searching unit 426 retrieves the process instances 600 of the subsequent process in order, starting with a process instance 600 specified from the outside source, on the basis of the subsequent process instance pointers recorded in the process instances 600. This allows the process instance backward searching unit 426 to identify the end products on which the process corresponding to the specified process instance 600 was performed in common. The process instance backward searching unit 426 may perform this backward search in order starting with the process instance 600 specified by the external tracing information processing unit 440 or may perform the backward search in order starting with the common process instance 600 extracted by the common process instance extracting unit 424.

The application processing unit 430 uses a process chain general model provided by the tracing information processing unit 440 and process instance searching unit 420 to execute a tracing application. The tracing application executed by the application processing unit 430 may make a quality assessment or quality assurance of each end product, perform a handling or servicing operations which differ depending on the end products, make an environmental impact assessment of each end product, perform the recycling of each end product, or perform optimum assignment of various resources in a process chain.

The tracing information processing unit 440 causes the process instance searching unit 420 to search the process instance chain, in accordance with a request from the application processing unit 430, and returns the result of the search. The tracing information processing unit 440 includes a tracing information output requesting unit 442, a tracing information output unit 444, a common product identifier output requesting unit 446, a common product identifier output unit 448, a common tracing information output requesting unit 450, and a common tracing information output unit 452.

The tracing information output requesting unit 442 requests, according to an instruction from the application processing unit 430, the process instance forward searching unit 422 to retrieve a process instance 600 corresponding to each process performed on a resultant product (such as an end product) resulting from a particular process instance 600. In response to this request, the process instance forward searching unit 422 searches forward through the process instance chain, starting with a particular process instance 600 to retrieve process instances 600 corresponding to processes performed on resultant products resulting from particular process instances 600. The tracing information output unit 444 provides a tracing information pointer recorded in each of the process instances 600 retrieved by the process instance forward searching unit 422 to the data directory searching unit 470 and causes the tracing information obtaining unit 480 to obtain multiple items of tracing information corresponding to the multiple process instances 600. Then, the multiple items of tracing information are provided to the application processing unit 430 as a set of items of tracing information concerning the resultant products resulting from the processes corresponding to the process instance 600 specified by the external application processing unit 430. Consequently, the application processing unit 430 can receive from the tracing information output unit 444 the execution conditions under which the processes were performed to obtain the resultant product resulting from the process instance 600 by specifying that process instance 600 through a general-purpose interface provided by the tracing information output requesting unit 442 and the tracing information output unit 444. The common product identifier output requesting unit 446 requests the process instance backward searching unit 426 to identify one or more resultant products or end products on which a process corresponding to a particular process instance 600 was performed in common, in accordance with an instruction from the application processing unit 430. In response to this request, the process instance backward searching unit 426 searches backward through the process instance chain, starting with a particular process instance 600 and retrieves, in order, subsequent process instances 600 on which the process corresponding to the particular process instance 600 was performed in common. Thus, the common product identifier output requesting unit 446 identifies one or more end products or resultant products on which the process corresponding to the specified process instance 600 was performed in common. The common product identifier output unit 448 outputs information identifying the end product or products identified by the process instance backward searching unit 426 to the application processing unit 430. Consequently, the application processing unit 430 can identify the one or more end products on which the process corresponding to the particular process instance 600 was performed by specifying the process instance 600 by using a general-purpose interface provided by the common product identifier output requesting unit 446 and the common product identifier output unit 448.

The common tracing information output requesting unit 450 requests the process instance forward searching unit 422 to retrieve the execution condition under which a process was performed on multiple process instances 600 in common, in accordance with an instruction from the application processing unit 430. In response to this request, the process instance forward searching unit 422 searches forward through the process instance chain, starting with each of the multiple process instances 600. Then, the common process instance extracting unit 424 extracts a common process instance 600 shared by sets of process instances 600 retrieved in association with each of the multiple process instances 600. The common tracing information output unit 452 provides the tracing information pointer recorded in the common process instance 600 extracted by the common process instance extracting unit 424 to the data directory searching unit 470 to cause the tracing information obtaining unit 480 to obtain the tracing information corresponding to the common process instance 600. Then, the obtained tracing information is provided to the application processing unit 430 as information for identifying the execution conditions under which the process was performed in common on resultant products resulting from the processes corresponding to the multiple process instances 600 specified by the application processing unit 430. Consequently, the application processing unit 430 can receive from the common tracing information output unit 452 the conditions under which the processes were executed on the resultant products resulting from the process instances 600 in common by specifying the multiple process instances 600 through a general-purpose interface provided by the common tracing information output requesting unit 450 and the common tracing information output unit 452.

The data directory storing unit 460 retrieves the correspondence between a tracing information pointer received from the distributed server device 120 and the storage location of the tracing information from the tracing information pointer storing unit 404 and stores them as a data directory that associates the tracing information pointer with the storage location of the tracing information. In other words, a tracing information pointer in the present embodiment functions as an indirect pointer specifying the storage location of tracing information. The information indicating the storage location of tracing information stored in the data directory may be a URL, for example, that indicates the distributed server device 120 and the storage location in that server device 120 in which the tracing information is stored.

The data directory searching unit 470 receives a tracing information pointer from the tracing information output unit 444 or the common tracing information output unit 452 and searches the data directory storing unit 460 for the storage location of the tracing information associated with the tracing information pointer. The tracing information obtaining unit 480 obtains the storage location of the tracing information retrieved by the data directory searching unit 470. Then, the tracing information obtaining unit 480 indicates that storage location to the distributed server device 120 indicated in the storage location information and obtains the tracing information specified by the tracing information pointer from the tracing information storing unit 310 of that distributed server device 120.

FIG. 5 shows a configuration of a model of a process 500 according to the present embodiment. The tracing system 10 according to the present embodiment provides an environment in which a process chain general model is created by using a generalized model of processes 500 as shown in FIG. 5. The model of the process 500 according to the present embodiment has a process identifier storage area 510, a precedent process pointer storage area 520, a quantity information storage area 525, a tracing information pointer storage area 530, a process-specific information storage area 535, and a subsequent process pointer storage area 540, and is provided to a user as, for example, a process class in an object-oriented language. The process identifier storage area 510 is a data area storing the identifier of the process 500 of interest. The precedent process pointer storage area 520 is a data area storing the pointer identifying the process identifier storage areas 510 of the precedent processes 500*a*–500*c* immediately preceding the process of interest 500*d* in the process chain. The quantity information storage area 525 is a data area storing the number of resultant products provided from each of the precedent processes 500*a*–500*c*.

The tracing information pointer storage area 530 is a data area storing the pointers of items of tracing information collected in association with a process that performs the process of interest 500*d*. The tracing information pointer storage area 530 stores the pointers of various types of tracing information. For example, the tracing information pointer storage area 530 stores a tracing information pointer indicating the storage location of conditions (lot conditions) under which the process of interest 500*d* was performed to obtain a lot of resultant products (semi-manufactured products or end products). A lot herein is a resultant product or a set of one or more resultant products resulting from the same conditions of the process of interest 500*d*.

The process-specific information storage area 535 is a data area storing information specific to the process of interest 500*d*. A user specifies information stored in the process-specific information storage area 535 for each process 500 when creating a process chain model. The information indicates the type of the process of interest 500*d* (information identifying an assembly process or processing process), a lot type, a lot quantity, the source of a lot, such as the manufacturer, the part number of resultant products, and the number of resultant products per lot.

The subsequent process pointer storage area 540 is a data area storing the process identifiers of the subsequent processes 500 following the process of interest 500*d* in the process chain. A user of the tracing system 10 uses a GUI provided by the tracing system 10 to define multiple processes 500, each of which is a model of each real process 110*a,b,c,d* . . . *x*, and links between the processes 500 by using precedent process pointers and subsequent process pointers. Then the user stores information specific to each process 500 in the process-specific information storage area 535 to create a model of the process chain.

FIG. 6 shows a configuration of a process instance 600 according to the present embodiment. The process instance generating unit 402 instantiates the model of the process 500 shown in FIG. 5 to generate the process instance 600 in association with a person and/or apparatus that performs the process of interest when executing the process 110*a,b,c, d* . . . *x* actually. The process instance 600 generated is stored in a process instance storage area provided in the process instance storing unit 410, which is an example of a recording medium of the present invention, and stored by the process instance storing unit 410. The process instance 600 according to the present embodiment has a process instance identifier 610, a precedent process instance pointer 620, a precedent process instance product quantity information 625, a tracing information pointer 630, process-instance-specific information 635, a subsequent process instance pointer 640, and subsequent process instance product quantity information 650. The process instance storing unit 410 stores these items of information in a process instance identifier storage area, a precedent process instance pointer storage area, a precedent process instance product quantity information storage area, a tracing information pointer storage area, a process-instance-specific information storage area, a subsequent process instance pointer storage area, and a subsequent process instance product quantity information storage area, which are provided in the process instance storage area corresponding to the process instance 600.

The process instance identifier 610 is an identifier of the process instance 600*d* of interest, which is assigned by the process instance generating unit 402 to the process instance identifier 610 when it is generated. The precedent process instance pointer 620 is a pointer identifying a precedent process instance 600*a*–600*c* preceding the process instance 600*d* and stored in the precedent process instance pointer storing unit 406. The precedent process instance product quantity information 625 is the number of resultant products resulting and provided from each precedent process instance 600*a*–600*c*, and is stored in the tracing information pointer storing unit 404.

The tracing information pointer 630 is a pointer pointing to the storage location of tracing information concerning execution conditions under which a process associated with the process instance of interest 600*d* is performed, and is stored in the tracing information pointer storing unit 404. The tracing information pointer 630 according to the present embodiment is an identifier of a material, processing condition, machine/tool/mold, inspector, or worker, and indirectly indicates the storage location of the tracing information describing these specific items of information through a data directory stored in the data directory storing unit 460.

The process-instance-specific information 635 is information specific to the process associated with the process instance 600*d* of interest, which is stored by the process instance generating unit 402. The information stored as the process-instance-specific information 635 may be information indicating the lot number of resultant products resulting from the process, time required for executing the process, quantity of the resultant products resulting from the process, the source of the lot, the part number of the resultant products, or the number of resultant products per lot.

The subsequent process instance pointer 640 is a pointer identifying the subsequent process instance 600 that follows the process instance 600*d* of interest and is stored in the subsequent process instance pointer storing unit 408. The subsequent process instance product quantity information 650 indicates the number of resultant products resulting from the process instance 600*d* of interest that were provided to the process corresponding to each subsequent process instance.

As has been described above, the tracing information registering unit 400 generates a process instance 600 for each process that performs a process and stores the pointers of the precedent process instance 600 and subsequent process instance 600 of the process instance 600 in that process instance 600. Thus, the tracing information registering unit 400 can link multiple process instances 600 corresponding to a series of processes performed for producing a resultant product or end product together in the execution order of the processes. Consequently the process instance searching unit 420 can search through the linked process instances 600 to efficiently collect tracing information concerning all processes performed on the resultant product or end product.

FIG. 7 shows an operation flow in the tracing system 10 according to the present embodiment. When a process 110*a,b,c,d* . . . *x* in the process chain is executed, the tracing information collecting unit 300 in the distributed server device 120 collects tracing information indicating the execution condition of the process in association with a person and/or apparatus that performs the process 110*a,b,c,d* . . . *x* (S700). Then, the tracing information collecting unit 300 stores the tracing information it collected in the tracing information storing unit 310 (S710). Then, the tracing information pointer transmitting unit 315 obtains from the tracing information collecting unit 300 the tracing information pointer pointing to the storage location on the tracing information storing unit 310 in which the tracing information is stored and sends it to the central server device 130 (S712). If the tracing information pointer is a material identifier or the like, then the tracing information pointer transmitting unit 315 sends the storage location of the information identified by the tracing information pointer in association with the tracing information pointer, to the central server device 130.

As has been described above, the tracing information collecting unit 300 collects or generates information such as the identifier, such as the lot number, of resultant products provided from the precedent process 110a,b,c,d . . . x, information to be stored in the process instance 600 as process-instance-specific information 635, the quantity of resultant products provided from a precedent process instance 600, and the quantity of resultant products provided to a subsequent process instance 600 at step S700. The tracing information pointer transmitting unit 315 transmits these items of information to the central server device 130 at step S712. Then, the process instance generating unit 402 in the central server device 130 generates a process instance 600 for each process that performs a process 110a,b,c,d . . . x from the information received from the tracing information pointer transmitting unit 315 (S714). Then, the tracing information pointer storing unit 404 stores the tracing information pointer received from the tracing information pointer transmitting unit 315 in the generated process instance 600, thereby registering the tracing information in the process instance 600 (S720). The tracing information pointer storing unit 404 also stores information such as the precedent process instance product quantity information 625, process-instance-specific information 635, and subsequent process instance product quantity information 650 in that process instance 600. Then, the precedent process instance pointer storing unit 406 stores the pointer of the precedent process instance 600 as the precedent process instance pointer 620 and also stores the quantity of resultant products provided as a result of the process corresponding to the precedent process instance 600 as the precedent process instance product quantity information 625 (S722). For example, the precedent process instance pointer storing unit 406 uses the identifier of the resultant product resulting from the precedent process 110a,b,c,d . . . x received from the distributed server device 120 to search for the precedent process instance 600 corresponding to the process that provided the resultant product and stores the pointer of that precedent process instance 600 as the precedent process instance pointer 620. Alternatively, the pointer of the precedent process instance 600 may be directly added to the resultant product resulting from the process corresponding to the precedent process instance 600, propagated through the processes 110a,b,c,d . . . x, and collected by the tracing information collecting unit 300. In that case, the tracing information collecting unit 300 also collects the pointer of the precedent process instance 600 at step S700 and the tracing information pointer transmitting unit 315 transmits it to the central server device 130 at step S712, and the precedent process instance pointer storing unit 406 stores the pointer it received as the precedent process instance pointer 620.

Then, the subsequent process instance pointer storing unit 408 stores the pointer of the subsequent process instance 600 as the subsequent process instance pointer 640 (S724). In particular, the subsequent process instance pointer storing unit 408 searches the process instance storing unit 410 for a precedent process instance 600 preceding the process instance 600 being processed. For example, the subsequent process instance pointer storing unit 408 uses identifier of the resultant product resulting from the precedent process 110a,b,c,d . . . x received from the distributed server device 120 to search for the precedent process instance 600 corresponding to the process that provided the resultant product. The subsequent process instance pointer storing unit 408 then stores the process instance identifier 610 of the process instance 600 being processed, as the subsequent process instance pointer 640 of the precedent process instance 600. Thus, the subsequent process instance pointer storing unit 408 can store the pointer of the subsequent process instance 600 of interest as the subsequent process instance pointer 640 of the precedent process instance 600.

Performing steps S700 to S724 described above for all processes performed for producing all end products, the tracing system 10 can generate a process instance chain consisting of all process instances 600 corresponding to the processes. The application processing unit 430 executes a tracing application using this process instance chain to process tracing information (S730).

The tracing system 10 can generate a process instance 600 for each process that performs a process 110a,b,c,d . . . x and link the multiple process instances 600 corresponding to a series of processes together, by the operation flow described above. The tracing system 10 enables an efficient search for a process instance 600 by centrally managing the linkages between the process instances 600 at the central server device 130. On the other hand, the tracing system 10 collects, in a distributed manner at the distributed server devices 120, the tracing information including conditions under which each process was performed and therefore can prevent the central server device 130 from being bottlenecked.

At steps S700, S710, and S712, the tracing system 10 can collect tracing information and generate a process instance 600 by any of the following methods (1) to (3) described below.

(1) Generating a new process instance 600 each time execution conditions change. When a distributed server device 120 performs a process assigned to it by inputting a resultant product resulting from the precedent process into that process, the tracing information collecting unit 300 in the distributed server device 120 collects tracing information identifying execution conditions of the process in association with the resultant product resulting from the execution of the process. For example, the tracing information collecting unit 300 collects tracing information identifying at least one of the conditions including conditions of a material or tool, conditions of workers, and temperature and humidity in performing the process of interest, in association with a resultant product resulting from the process. If an item of tracing information different from the tracing information collected just before is collected in the course performing the process by providing multiple resultant products, the tracing information storing unit 310 stores the newly collected tracing information and the tracing information pointer transmitting unit 315 transmits the pointer of the newly collected tracing information to the central server device 130. Consequently, the process instance generating unit 402 in the central server device 130 generates multiple process instances when multiple different items of tracing information are collected in association with the resultant products resulting from the process. For example, when a plurality of items of tracing information that differ in any of a material or tool condition, worker condition, or temperature or humidity condition are collected, the process instance generating unit 402 generates multiple items of process instance information. Then the tracing information pointer storing unit 404 stores the pointer pointing to the storage location of each of the different items of tracing information in each process instance. By this method, the tracing system 10 can generate a common process instance 600 and register a common item of tracing information for multiple resultant products that share the same execution condition and thereby can reduce the number of process instances 600 it generates.

(2) Generating a new process instance 600 each time a certain quantity of resultant products are provided from the process. When the distributed server device 120 performs a process by inputting a resultant product from the precedent process, the tracing information collecting unit 300 in the distributed server device 120 collects tracing information identifying the execution conditions of the process, in association with each group of a predetermined number or amount of resultant products resulting from the process. That is, the tracing information collecting unit 300 groups the resultant products into lots of a predetermined number or amount and collects tracing information in association with each lot of resultant products. Then, the tracing information storing unit 310 stores the collected tracing information and the tracing information pointer transmitting unit 315 transmits the pointer of the tracing information to the central server device 130. Consequently, the process instance generating unit 402 in the central server device 130 generates a process instance in association with each group of resultant products. Then the tracing information pointer storing unit 404 stores the tracing information pointer collected in association with each group in the process instance associated with the group. By this method, the tracing system 10 can generate a process instance 600 each time a predetermined number or amount of resultant products are produced from each process and thereby can make multiple process instances 600 associated with the same process uniform.

(3) Generating a new process instance 600 in each predetermined time segment. When the distributed server device 120 performs a process by inputting a resultant product of a precedent process, the tracing information collecting unit 300 in the distributed server device 120 collects tracing information identifying execution conditions, in association with each group of resultant products produced in each time segment of the process segments. That is, the tracing information collecting unit 300 groups the resultant products produced in a predetermined time segment together as a lot and collects tracing information for each lot of the resultant products. One time segment may be one hour or the daytime/nighttime, for example. Then, the tracing information storing unit 310 stores the collected tracing information and the tracing information pointer transmitting unit 315 transmits the pointers of the tracing information to the central server device 130. Like method (2) described above, this method generates process instances corresponding to the groups of resultant products. The tracing information pointer storing unit 404 stores a tracing information pointer collected for each group into the process instance associated with that group. By this method, the tracing system 10 can generate process instances 600, each of which is associated with the resultant products produced from each process during a time segment and thereby can make the process instances 600 of the same process uniform. Alternatively, the central server device 130 may generate multiple process instances 600 previously according to an execution schedule for executing the processes 110$a,b,c,d \ldots x$ and store them in the process instance storing unit 410. In that case, every time the central server device 130 receives the pointer of tracing information obtained as a result of a process executed in accordance with the execution schedule from a distributed server device 120, the central server device 130 stores the tracing information pointer in a process instance 600 generated beforehand for registering the tracing information. Alternatively, the distributed server device 120 may reserve a storage area on the tracing information storing unit 310 for storing tracing information before collecting the tracing information and send the pointer of the tracing information to the central server device 130 in advance. In that case, the central server device 130 can store a tracing information pointer in a process instance 600 before each process 110$a,b,c,d \ldots x$ is executed. Thus, the tracing system 10 can minimize traffic between the distributed server device 120 and the central server device 130 during the execution of the process 110$a,b,c,d \ldots x$.

FIG. 8 shows a first exemplary tracing information processing flow in the tracing system 10 according to the present embodiment. In the tracing information processing flow, the tracing information processing unit 440 provides to the application processing unit 430 all items of tracing information collected in the course of producing a particular end product specified by a user, in response to a request from the application processing unit 430. This processing flow can be used for the purpose of obtaining all items of tracing information concerning the particular end product to provide customer services in response to an inquiry about that end product from a buyer. First, the tracing information output requesting unit 442 requests the process instance forward searching unit 422 to retrieve the process instance 600 corresponding to processes performed on an end product, in response to specification of the end product from the application processing unit 430 (S800). In response to this request, the process instance forward searching unit 422 searches forward through the process instance chain, starting from the process instance 600 associated with the end product and retrieves all process instances 600 corresponding to all the processes performed on the end product (S810). Then, the tracing information output unit 444 provides the tracing information pointers stored in the process instances 600 retrieved by the process instance forward searching unit 422 to the data directory searching unit 470. In response to this, the data directory searching unit 470 searches the data directory storing unit 460 for the storage locations of the items of tracing information associated with the tracing information pointers (S820). Then, the tracing information obtaining unit 480 obtains the items of tracing information from the distributed server devices 120 on the basis of the information indicating the storage locations of the items of tracing information and provides them to the tracing information output unit 444 (S830). In response to this, the tracing information output unit 444 outputs the items of tracing information to the application processing unit 430 (S840). Thus, in response to a request for outputting all items of tracing information concerning a particular end product, the central server device 130 can retrieve the process instances 600 corresponding to all processes performed on that particular end product without communications with the distributed server devices 120. Furthermore, the central server device 130 obtains from the distributed server devices 120 only the items of information to be provided to the application processing unit 430 and thereby can reduce traffic to and from the distributed server devices 120.

FIG. 9 shows a second exemplary tracing information processing flow in the tracing system 10 according to the present embodiment. In this tracing information processing flow, the tracing information processing unit 440 provides to the application processing unit 430 information identifying one or more end products on which a particular process specified by a user was performed in common, in response to a request from the application processing unit 430. This processing flow can be used for the purpose of identifying an end product on which a process in which an imperfection was found was performed and remedying the end product. First, in response to specification of a process instance 600 corresponding to the process from the application processing unit 430, the common product identifier output requesting unit 446 requests the process instance backward searching unit 426 to identify one or more end products on which the process corresponding to the process was performed (S900). In response to this request, the process instance backward searching unit 426 searches backward through the process instance chain, starting with a particular process instance 600 and sequentially retrieves the subsequent process instances 600 in which the process corresponding to the process instance 600 is performed in common (S910). Thus, the common product identifier output requesting unit 446 identifies the one or more end products on which the process corresponding to the specified process instance 600 was performed in common. Then, the common product identifier output unit 448 outputs to the application processing unit 430 the information identifying the end product(s) identified by the process instance backward searching unit 426 (S920). Thus, the central server device 130 can search backward through the process instance chain, starting with the process instance 600 corresponding to a particular process to retrieve all end products on which that particular process was performed in common, without performing communications to and from the distributed server devices 120.

FIG. 10 shows a third exemplary tracing information processing flow in the tracing system 10 according to the present embodiment. In this tracing information processing flow, the tracing information processing unit 440, in response to a request from the application processing unit 430, identifies a process performed in common on multiple end products specified by a user and outputs tracing information collected for the process. The processing flow can be used for the purpose of identifying a process performed in common on multiple end products in which an imperfection was found and examining the conditions under which the process was executed.

First, in response to specification of multiple end products from the application processing unit 430, the common tracing information output requesting unit 450 requests the process instance forward searching unit 422 to retrieve process instances 600 corresponding to processes performed on each of the end products (S1000). In response to this, the process instance forward searching unit 422 searches forward through the process instance chain, starting with the process instance 600 for each end product and a set of process instances 600 corresponding to all processes performed on the end product (S1010). Then, the common process instance extracting unit 424 extracts a process instance 600 shared by the set of process instances 600 retrieved by the process instance forward searching unit 422 for each end product (S1020). Then, the common tracing information output unit 452 provides the tracing information pointer stored in the common process instance 600 extracted by the common process instance extracting unit 424 to the data directory searching unit 470 to obtain the tracing information from the tracing information obtaining unit 480 and outputs it to the application processing unit 430 (S1030). Thus, the central server device 130 can extract the process instance 600 corresponding to the process performed on the multiple end products in common by searching forward through the process instance chain, starting with the process instance 600 for each of the multiple end products, without performing communication to and from the distributed server devices 120.

FIG. 11 shows an example of a process chain according to the present embodiment. The process chain shown in FIG. 11 includes a material A procurement process 1100 for procuring material A, a part A processing process 1110 for processing material A to provide part A, a material B procurement process 1120 for procuring material B, a part B processing process 1130 for processing material B to provide part B, a product assembly process 1140 for assembling parts A and B into a product to provide commodity product X, and a commodity product X process 1150 corresponding to an end product of commodity product X. Each of the processes in FIG. 11 is modeled into the process 500 shown in FIG. 5.

FIG. 12 shows an example of links between process instances according to the present embodiment. In this example, the tracing system 10 generates a material A procurement process instance 1300a in association with a person and/or apparatus that performs the material A procurement process 1100 to provide materials A1 and A2 as resultant products. It also generates a material A procurement process instance 1300b in association with a person and/or apparatus that performs the material A procurement process 1100 to provide materials A3, A4, and A5 as resultant products. Then the part A processing process 1110 receives materials A1, A2, and A3 provided from the precedent material A procurement process instances 1300a and 1300b. The part A processing process 1110 is performed under the same execution conditions to provide parts A1, A2, and A3 as resultant products. The tracing system 10 generates a part A processing process instance 1310a in association with this real process. The part A processing process 1110 receives materials A4 and A5 provided from the precedent material A procurement process instance 1300b. The part A processing process 1110 is performed under the same execution conditions to provide parts A4 and A5 as resultant products. The tracing system 10 generates a part A processing process instance 1310b in association with this real process. The tracing system 10 then generates a material B procurement process instance 1320a in association with a real process that performs the material B procurement process 1120 to provide materials B1, B2, and B3 as resultant products. It also generates a material B procurement process instance 1320b in association with a real process that performs the material B procurement process 1120 to provide materials B4 and B5 as resultant products. Then, the part B processing process 1130 receives materials B1 and B2 provided from the precedent material B procurement process instance 1320a. The part B processing process 1130 is performed under the same execution conditions to provide parts B1 and B2 as resultant products. The tracing system 10 generates a part B processing process instance 1330a in association with this real process. The part B processing process 1130 receives materials B3, B4, and B5 provided from the precedent material B procurement process instances 1320a and 1320b. The part B processing process 1130 is performed under the same execution conditions to provide parts B3, B4, and B5 as resultant products. The tracing system 10 generates a part B processing process instance 1330b in association with this real process. Then, the product assembly process 1140 receives part B1 provided from the precedent part B processing process instance 1330a to provide commodity product X1. The tracing system 10 generates a product assembly process instance 1340a in association with this real process. Similarly, the product assembly process 1140 receives parts B2 and B3 and provides products X2 and X3, and receives parts B4 and B5 and provides products X4 and X5. The tracing system 10 generates product assembly process instances 1340b and 1340c in association with these real processes. Then, the tracing system 10 generates commodity product X process instances 1350a–1350e in association with commodity products X1–X5, which are the end products.

In the processing flow described above, the tracing system 10 uses precedent process instance pointers and subsequent process instance pointers to link the process instances with one another to build a process instance chain. In this state, when receiving a request for outputting all items of tracing information collected for commodity product X4 from the application processing unit 430, the process instance searching unit 420 searches forward through the process instance chain from the commodity product X process instance 1350b corresponding to commodity product X4 as shown in FIG. 8 and retrieves a set of process instances corresponding to the processes performed on commodity product X4, {product assembly process instance 1340c, part B processing process instance 1330b, material B procurement process instance 1320a, material B procurement process instance 1320b, part A processing process instance 1310b, material A procurement process instance 1300b}. Then, the tracing information processing unit 440 uses tracing information pointers contained in these process instances to obtain the items of tracing information associated with the process instances and provides them to the application processing unit 430. Furthermore, when receiving a request for identifying the end product on which a process corresponding to part B processing process instance 1330a is performed from the application processing unit 430, the process instance searching unit 420 searches backward through the process instance chain, starting with part B processing process instance 1330a as shown in FIG. 9 and retrieves a set of process instances, {commodity product X process instance 1350a, commodity product X process instance 1350b}. Then, the tracing information processing unit 440 outputs information identifying commodity products X1 and X2, which are the end products corresponding to these process instances, to the application processing unit 430. Furthermore, when receiving a request for outputting items of tracing information collected in association with processes performed on commodity products X1 and X4 in common from the application processing unit 430, the process instance searching unit 420 searches forward through the process instance chain, starting with each of the commodity products, as shown in FIG. 10. The process instance searching unit 420 extracts process instances {material A procurement process instance 1300b, material B procurement process instance 1320a} that are common to the set of process instances retrieved in association with the commodity products. Then, the tracing information processing unit 440 obtains the items of tracing information associated with these process instances and provides them to the application processing unit 430.

According to the tracing system 10 described above, the central server device 130 searches through a process instance chain and the distributed server device 120 collects tracing information, thus a large process chain can be implemented efficiently. Furthermore, because processes are generalized as a process 500, a process chain can be implemented by using the general model that can be applied to various fields of applications. Moreover, the data structure of process instances 600 is generalized and the process instance chain search is performed by the modularized process instance searching unit 420, thus applications can access tracing information through the unitary means.

FIG. 13 shows a hardware configuration of a computer 1900 according to the present embodiment. The computer 1900 according to the present embodiment includes a CPU section including a CPU 2000, a RAM 2020, a graphic controller 2075, and display device 2080 interconnected through a host controller 2082, an input-output section including a communication interface 2030, a hard disk drive 2040, and a CD-ROM drive 2060, which are connected to the host controller 2082 through an input-output controller 2084, and a legacy input-output section including a ROM 2010, a flexible-disk drive 2050, and an input-output chip 2070, which are connected to the input-output controller 2084. The host controller 2082 connects the RAM 2020 with the CPU 2000 and the graphic controller 2075, which access the RAM 2020 at higher transfer rates. The CPU 2000 operates according to programs stored in the ROM 2010 and the RAM 2020 to control components of the computer. The graphic controller 2075 obtains image data generated by the CPU 2000 on a frame buffer provided in the RAM 2020 and causes it to be displayed on the display device 2080. Alternatively, the graphic controller 2075 may contain a frame buffer for storing image data generated by the CPU 2000. The input-output controller 2084 connects the host controller 2082 with the communication interface 2030, the hard disk drive 2040, and the CD-ROM drive 2060, which are relatively fast input/output devices. The communication interface 2030 communicates with external devices through a network. The hard disk drive 2040 stores programs and data used by the CPU 2000 in the computer 1900. The CD-ROM drive 2060 reads a program or data from a CD-ROM 2095 and provides it to the hard disk drive 2040 through the RAM 2020. Connected to the input-output controller 2084 are the ROM 2010 and relatively slow devices such as the flexible-disk drive 2050 and input-output chip 2070. The ROM 2010 stores a boot program executed by the computer 1900 during boot-up and programs dependent on the hardware of the computer 1900. The flexible-disk drive 2050 reads a program or data from a flexible disk 2090 and provides it to the hard disk drive 2040 through the RAM 2020. Connected to the input-output chip 2070 are a flexible-disk drive 2050 and input/output devices through ports such as a parallel port, serial port, keyboard port, and mouse port, for example.

A program to be provided to the hard disk drive 2040 through the RAM 2020 is stored on a recording medium such as a flexible disk 2090, a CD-ROM 2095, or an IC card and provided by a user. The program is read from the recording medium, installed in the hard disk drive 2040 in the computer 1900 through the RAM 2020, and executed in the CPU 2000. The program that is installed in the computer 1900 and causes the computer 1900 to function as a distributed server device 120 includes a tracing information collecting module, a tracing information managing module, a tracing information pointer transmitting module, a tracing information transmitting module. These programs or modules control the CPU 2000 and other components to cause the computer 1900 to function as the tracing information collecting unit 300, tracing information storing unit 310, tracing information pointer transmitting unit 315, and tracing information transmitting unit 320, respectively. The program that is installed in the computer 1900 and causes the computer 1900 to function as the central server device 130 includes: a tracing information registering module having a process instance generating module, a tracing information pointer storing module, a precedent process instance pointer storing module, and a subsequent process instance pointer storing module; a process instance managing module; a process instance searching module having a process instance forward searching module, a common process instance extracting module, and a process instance backward searching module; an application processing module; a tracing information processing module having a tracing information output requesting module, a tracing information output module, a common product identifier output requesting module, a common product identifier output module, a common tracing information output requesting module, and a common tracing information output module; a data directory managing module; data directory searching module; and a tracing information obtaining module. These programs or modules control the CPU 2000 and other components to cause the computer 1900 to function as the tracing information registering unit 400 having the process instance generating unit 402, tracing information pointer storing unit 404, precedent process instance pointer storing unit 406, and subsequent process instance pointer storing unit 408; the process instance storing unit 410; the process instance searching unit 420 having the process instance forward searching unit 422, common process instance extracting unit 424, and process instance backward searching unit 426; the application processing unit 430; the tracing information processing unit 440 having the tracing information output requesting unit 442, tracing information output unit 444, common product identifier output requesting unit 446, common product identifier output unit 448, common tracing information output requesting unit 450, and common tracing information output unit 452; the data directory storing unit 460; the data directory searching unit 470, and the tracing information obtaining unit 480.

The programs or modules provided above may be stored in an external storage medium. The storage medium may be a flexible disk 2090 or a CD-ROM 2095, or an optical recording medium such as a DVD and CD, a magneto-optical recording medium such as an MO, a tape medium, or a semiconductor memory such as an IC card. Alternatively, a storage device such as a hard disk or a RAM provided in a server system connected to a private communication network or the Internet may be used as the recording medium and the programs may be provided from the storage device to the computer 1900 over the network.

While the present invention has been described with respect to embodiments thereof, the technical scope of the present invention is not limited to that described with the embodiments. It will be apparent to those skilled in the art that various modifications or improvements can be made to the embodiment. It will be apparent from the claims that embodiments to which such modifications and improvements are made also fall within the scope of the technical scope of the present invention.

The invention claimed is:

1. A method for tracing a series of processes for producing a product, said method comprising the steps of:
   generating a first process instance for a first one of said processes, and storing tracing information in association with said first process instance to indicate an execution condition for said first process instance;
   generating a second process instance for a second one of said processes, and storing tracing information in association with said second process instance to indicate an execution condition for said second process instance;
   generating a third process instance for a third one of said processes, and storing tracing information in association with said third process instance to indicate an execution condition for said third process instance;
   said third process instance being executed after said second process instance, said second process instance being executed after said first process instance, said first process instance yielding a product which is subject to said second process instance, and said second process instance yielding a product which is subject to said third process instance; and
   storing a first pointer to indicate that said second process instance follows said first process instance, and a second pointer to indicate that said third process instance follows said second process instance.

2. A method as set forth in claim 1 further comprising the steps of:
   generating a fourth process instance for said first process, storing tracing information in association with said fourth process instance to indicate an execution condition for said fourth process instance, and determining if the execution conditions for the process instances for said first process differ from each other;
   generating a fifth process instance for said second process, storing tracing information in association with said fifth process instance to indicate an execution condition for said fifth process instance, and determining if the execution conditions for the process instances for said second process differ from each other; and
   generating a sixth process instance for said third process, storing tracing information in association with said sixth process instance to indicate an execution condition for said sixth process instance, and determining if the execution conditions for the process instances for said third process differ from each other.

3. A method as set forth in claim 1 further comprising the steps of:
   upon request, automatically fetching and displaying said process instances in forward order, and upon request, automatically fetching and displaying said process instances in reverse order.

4. A method as set forth in claim 1 wherein said execution conditions for said first, second and third process instances comprise at least one of the following: a material condition or tool condition, a worker condition, and a temperature condition or humidity condition under which the respective process is executed.

5. A method as set forth in claim 1 further comprising the step of fetching and displaying said tracing information for said process instances for said first, second and third processes.

6. A method as set forth in claim 1 further comprising the steps of:
   generating other process instances for said first process, and storing tracing information in association with said other process instances for said first process to indicate execution conditions for other instances of said first process;

generating other process instances for said second process, and storing tracing information in association with said other process instances for said second process to indicate execution conditions for said other instances of said second process;

generating other process instances for said third process, and storing tracing information in association with said other process instances for said third process to indicate execution conditions for said other instances of said third process; and correlating together tracing information for process instances corresponding to end products formed during a time window.

7. A system for tracing a series of processes for producing a product, said system comprising:

means for generating a first process instance for a first one of said processes, and storing tracing information in association with said first process instance to indicate an execution condition for said first process instance;

means for generating a second process instance for a second one of said processes, and storing tracing information in association with said second process instance to indicate an execution condition for said second process instance; and means for generating a third process instance for a third one of said processes, and storing tracing information in association with said third process instance to indicate an execution condition for said third process instance; wherein said third process instance is executed after said second process instance, said second process instance is executed after said first process instance, said first process instance yields a product which is subject to said second process instance, and said second process instance yields a product which is subject to said third process instance; and further comprising:

means for storing a first pointer to indicate that said second process instance follows said first process instance, and a second pointer to indicate that said third process instance follows said second process instance.

8. A system as set forth in claim 7 further comprising:

means for generating a fourth process instance for said first process, storing tracing information in association with said fourth process instance to indicate an execution condition for said fourth process instance, and determining if the execution conditions for the process instances for said first process differ from each other;

means for generating a fifth process instance for said second process, storing tracing information in association with said fifth process instance to indicate an execution condition for said fifth process instance, and determining if the execution conditions for the process instances for said second process differ from each other; and means for generating a sixth process instance for said third process, storing tracing information in association with said sixth process instance to indicate an execution condition for said sixth process instance, and determining if the execution conditions for the process instances for said third process differ from each other.

9. A system as set forth in claim 7 further comprising:

means, active upon request, for automatically fetching and displaying said process instances in forward order, and active upon request, for automatically fetching and displaying said process instances in reverse order.

10. A system as set forth in claim 7 wherein said execution conditions for said first, second and third process instances comprise at least one of the following: a material condition or tool condition, a worker condition, and a temperature condition or humidity condition under which the respective process is executed.

11. A system as set forth in claim 7 further comprising means for fetching and displaying said tracing information for said process instances for said first, second and third processes.

12. A system as set forth in claim 7 further comprising:

means for generating other process instances for said first process, and storing tracing information in association with said other process instances for said first process to indicate execution conditions for other instances of said first process;

means for generating other process instances for said second process, and storing tracing information in association with said other process instances for said second process to indicate execution conditions for said other instances of said second process;

means for generating other process instances for said third process, and storing tracing information in association with said other process instances for said third process to indicate execution conditions for said other instances of said third process; and means for correlating together tracing information for process instances corresponding to end products formed during a time window.

13. A computer program product for tracing a series of processes for producing a product, said computer program product comprising:

a computer readable medium;

first program instructions to generate a first process instance for a first one of said processes, and store tracing information in association with said first process instance to indicate an execution condition for said first process instance;

second program instructions to generate a second process instance for a second one of said processes, and store tracing information in association with said second process instance to indicate an execution condition for said second process instance; and third program instructions to generate a third process instance for a third one of said processes, and store tracing information in association with said third process instance to indicate an execution condition for said third process instance; and wherein said third process instance is executed after said second process instance, said second process instance is executed after said first process instance, said first process instance yields a product which is subject to said second process instance, and said second process instance yields a product which is subject to said third process instance; and further comprising:

fourth program instructions to store a first pointer to indicate that said second process instance follows said first process instance, and a second pointer to indicate that said third process instance follows said second process instance; and wherein said first, second, third and fourth program instructions are stored on said medium.

14. A computer program product as set forth in claim 13 further comprising:

fifth program instructions to generate a fourth process instance for said first process, store tracing information in association with said fourth process instance to indicate an execution condition for said fourth process instance, and determine if the execution conditions for the process instances for said first process differ from each other;

sixth program instructions to generate a fifth process instance for said second process, store tracing information in association with said fifth process instance to indicate an execution condition for said fifth process instance, and determine if the execution conditions for the process instances for said second process differ from each other; and seventh program instructions to generate a sixth process instance for said third process, store tracing information in association with said sixth process instance to indicate an execution condition for said sixth process instance, and determine if the execution conditions for the process instances for said third process differ from each other; and wherein said fifth, sixth and seventh program instructions are stored on said medium.

15. A computer program product as set forth in claim 13 further comprising:

fifth program instructions, active upon request, to automatically fetch and display said process instances in forward order, and active upon request, to automatically fetch and display said process instances in reverse order; and wherein said fifth program instructions are stored on said medium.

16. A computer program product as set forth in claim 13 wherein said execution conditions for said first, second and third process instances comprise at least one of the following: a material condition or tool condition, a worker condition, and a temperature condition or humidity condition under which the respective process is executed.

17. A computer program product as set forth in claim 13 further comprising fifth program instructions to fetch and display said tracing information for said process instances for said first, second and third processes; and wherein said fifth program instructions are stored on said medium.

18. A computer program product as set forth in claim 13 further comprising:

fifth program instructions to generate other process instances for said first process, and store tracing information in association with said other process instances for said first process to indicate execution conditions for other instances of said first process;

sixth program instructions to generate other process instances for said second process, and store tracing information in association with said other process instances for said second process to indicate execution conditions for said other instances of said second process;

seventh program instructions to generate other process instances for said third process, and store tracing information in association with said other process instances for said third process to indicate execution conditions for said other instances of said third process; and eighth program instructions to correlate together tracing information for process instances corresponding to end products formed during a time window; and wherein said fifth, sixth, seventh and eighth program instructions are stored on said medium.

* * * * *